(12) United States Patent
Prince

(10) Patent No.: US 7,119,972 B2
(45) Date of Patent: Oct. 10, 2006

(54) APPARATUS AND METHOD FOR THE MANIPULATION OF A LASER BEAM IN REFLECTION

(75) Inventor: James B. Prince, Clovis, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 27 days.

(21) Appl. No.: 10/877,546

(22) Filed: Jun. 24, 2004

(65) Prior Publication Data

US 2005/0286147 A1    Dec. 29, 2005

(51) Int. Cl.
*G02B 5/04*   (2006.01)
*G02B 7/18*   (2006.01)

(52) U.S. Cl. .................. 359/837; 359/833; 359/831
(58) Field of Classification Search ............. 359/211, 359/222, 431, 831, 833, 837, 811, 819, 822, 359/823, 871, 876, 476
See application file for complete search history.

(56) References Cited

U.S. PATENT DOCUMENTS

| | | | |
|---|---|---|---|
| 1,680,534 A * | 8/1928 | Garbutt et al. ............. 355/52 |
| 2,458,831 A * | 1/1949 | Cady ...................... 356/252 |
| 3,881,802 A * | 5/1975 | Helava .................... 359/211 |
| 4,313,272 A | 2/1982 | Matthews | |
| 4,515,447 A * | 5/1985 | Weimer et al. ........... 359/388 |
| 4,522,474 A | 6/1985 | Slavin | |
| 4,698,498 A * | 10/1987 | Mahoney et al. .......... 250/234 |
| 5,153,775 A * | 10/1992 | Itami et al. .............. 359/637 |
| 5,689,369 A * | 11/1997 | Noguchi ................... 359/557 |
| 5,771,097 A * | 6/1998 | Kusunose et al. .......... 356/520 |
| 6,014,205 A * | 1/2000 | Kanazawa et al. ........... 356/73 |
| 6,115,121 A * | 9/2000 | Erskine .................... 356/450 |
| 6,501,772 B1 | 12/2002 | Peterson | |
| 2003/0095733 A1* | 5/2003 | Lin ......................... 385/11 |
| 2004/0136006 A1* | 7/2004 | Abbink .................... 356/451 |
| 2004/0240088 A1* | 12/2004 | Prince et al. ............. 359/831 |
| 2005/0002039 A1* | 1/2005 | Abbink .................... 356/451 |

FOREIGN PATENT DOCUMENTS

| | | |
|---|---|---|
| DE | 40 36 745 A1 | 5/1991 |
| EP | 0 070 333 A2 | 11/1981 |
| EP | 0 067 761 A2 | 6/1982 |
| JP | 57091423 A | 6/1982 |
| JP | 60257189 A | 12/1985 |
| JP | 2002-277812 A | 9/2002 |

* cited by examiner

*Primary Examiner*—Arnel C. Lovarias
*Assistant Examiner*—Aline D. McNaull

(57) ABSTRACT

An apparatus for manipulating a path of a beam includes a first wedge and a second wedge. The first wedge includes a first refractive surface and a second refractive surface. The second wedge includes a third refractive surface adjacent to the second refractive surface, and a reflective surface. The beam refracts at the first refractive surface, refracts at the second refractive surface, refracts at the third refractive surface, reflects from reflective surface, refracts at the third refractive surface, refracts at the second refractive surface, refracts at the first refractive surface. At least one of the first wedge and the second wedge can be rotated so that the beam exiting the apparatus can be oriented substantially orthogonal to the beam entering the apparatus.

15 Claims, 6 Drawing Sheets

US 7,119,972 B2

APPARATUS AND METHOD FOR THE MANIPULATION OF A LASER BEAM IN REFLECTION

DESCRIPTION OF RELATED ART

FIGS. 1A and 1B illustrate a conventional beam manipulator 100 using matched prisms (wedges) 110 and 120, which are sometimes referred to as a Risley prism set, to adjust the direction of a beam 130. Beam 130, which is incident on wedge 110, refracts in accordance with Snell's Law at each of the four air-glass interfaces 111, 112, 121, and 122 of the two wedges 110 and 120.

In the configuration of FIG. 1A, consecutive interfaces 112 and 121 are parallel to each other, and the angular deflection of beam 130 at interface 121 is equal and opposite to the angular deflection of beam 130 at interface 112. Similarly, interfaces 111 and 122 are parallel to each other, and since interfaces 112 and 121 cause no net angular deflection, the angular deflection of beam 130 at interface 122 is equal and opposite to the angular deflection at interface 111. Accordingly, in the configuration of FIG. 1 A, system 100 causes no net angular deflection of beam 130.

Wedges 110 and 120 can be rotated with respect to each other to change the relative angle between interfaces 112 and 121. FIG. 1B illustrates a configuration of system 100 where wedge 120 has been rotated so that interfaces 112 and 121 make a maximum angle with each other. In the configuration of FIG. 1B, refractions at interfaces 112, 121, and 122 deflect beam 130 in the same direction, causing the largest angular deflection θmax that system 100 can achieve. Smaller rotations of wedge 120 relative to wedge 110 produce smaller angular deflections, so that system 100 can achieve any desired angular deflection of beam 130 between 0 and θmax. The relative orientations of wedges 110 and 120 can thus be set to provide the desired (polar) angular deflection. System 100 can be also rotated as a unit about its optical axis to adjust an azimuthal angle of the deflection.

SUMMARY

In one embodiment of the invention, an apparatus for manipulating a path of a beam includes a first wedge and a second wedge. The first wedge includes a first refractive surface and a second refractive surface. The second wedge includes a third refractive surface adjacent to the second refractive surface, and a reflective surface. The beam refracts at the first refractive surface, refracts at the second refractive surface, refracts at the third refractive surface, reflects from reflective surface, refracts at the third refractive surface, refracts at the second refractive surface, and refracts at the first refractive surface. At least one of the first wedge and the second wedge can be rotated so that the beam exiting the apparatus can be oriented substantially orthogonal to the beam entering the apparatus.

BRIEF DESCRIPTION OF THE DRAWINGS

Use of the same reference symbols in different figures indicates similar or identical items. The figures are not drawn to scale and are for illustrative purposes only.

DETAILED DESCRIPTION

In accordance with the invention, a Risley prism set is modified to create an adjustable turning mirror. The outer surface of one wedge in the prism set is coated with a reflective material. Thus, a light beam is reflected back through the two wedges instead of passing through them. The reflection of the light beam can be controlled by rotating one or both of the wedges. The modified prism set has been named a "Risley prism mirror." The Risley prism mirror can replace expensive turning mirrors using complicated adjustable mounts.

Figure 1A:
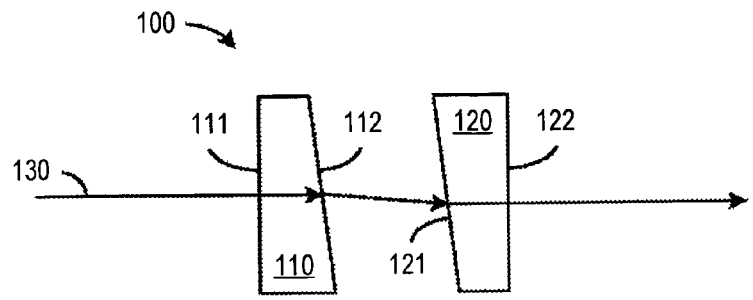
FIGS. 1A and 1B are cross-sectional views of a prior art Risley prism set.
Figure 1B:
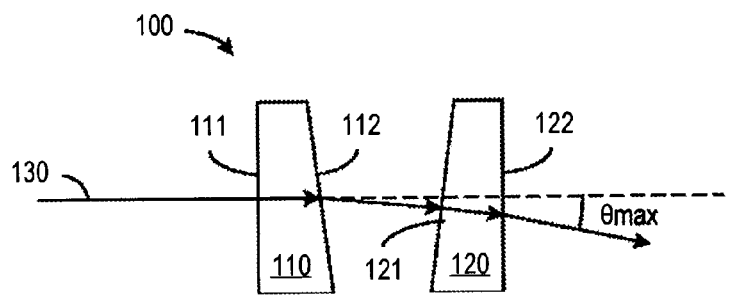
Figure 2:
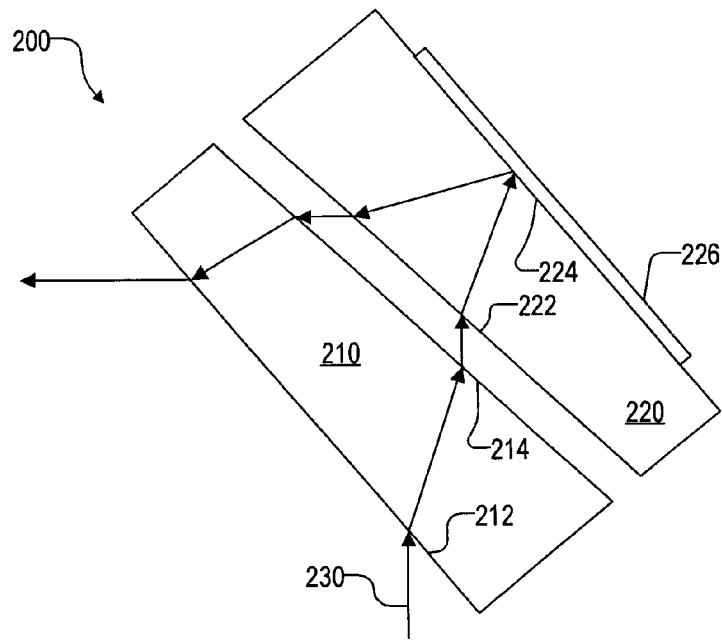
FIG. 2 is a cross-sectional view of an adjustable turning mirror in one embodiment of the invention.

FIG. 2 shows a side view of an adjustable turning mirror 200 for reflecting a light beam in one embodiment of the invention. Mirror 200 includes prisms 210 and 220, which are also commonly referred to as "wedges." In one embodiment, wedges 210 and 220 are configured with parallel surfaces 212 and 224 furthest from each other and angled surfaces 214 and 222 adjacent to each other.

Mirror 200 is placed in the path of a light beam 230, which impinges on refracting surface 212. Surface 212 may have an antireflective coating. Beam 230 refracts at surface 212 and travels through wedge 210 toward refracting surface 214. Surface 214 may have an antireflective coating. Beam 230 refracts again at surface 214 and then exits wedge 210.

Beam 230 travels through the air and impinges on refracting surface 222. Surface 222 may have an antireflective coating. Beam 230 refracts at surface 222 and travels through wedge 220 toward reflective surface 224. In one embodiment, surface 224 has a reflective coating 226. In another embodiment, a mirror 226 is glued to or mechanically held against wedge 220 (e.g., by a spring finger). Thus beam 230 reflects from surface 224 and travels back towards refracting surface 222. Beam 230 refracts at surface 222 and then exits wedge 220.

Beam 230 travels through the air and impinges on refracting surface 214. Beam 230 refracts at surface 214 and travels through wedge 210 toward refracting surface 212. Beam 230 refracts again at surface 212 and then exits wedge 210. In one embodiment, wedges 210 and 220 are oriented so the output path of beam 230 is substantially orthogonal to the input path of beam 230 in order to create an adjustable 90° turning mirror. For example, wedges 210 and 220 are oriented so that beam 230 has an angle of incidence of approximately 45° to surface 212. Alternatively, wedges 210 and 220 can be oriented to create an adjustable turning mirror having any turning angle between 0° up to 180°. Wedges 210 and 220 are then rotated to fine tune the beam reflection.

Matched wedge sets with different wedge angles can vary the magnitude of the reflected steering adjustment. Larger wedge angles typically provide a larger range of adjustment at the cost of coarser resolution. Similarly, better resolution can be achieved with finer wedges at the expense of a smaller adjustment range.

Figure 3:
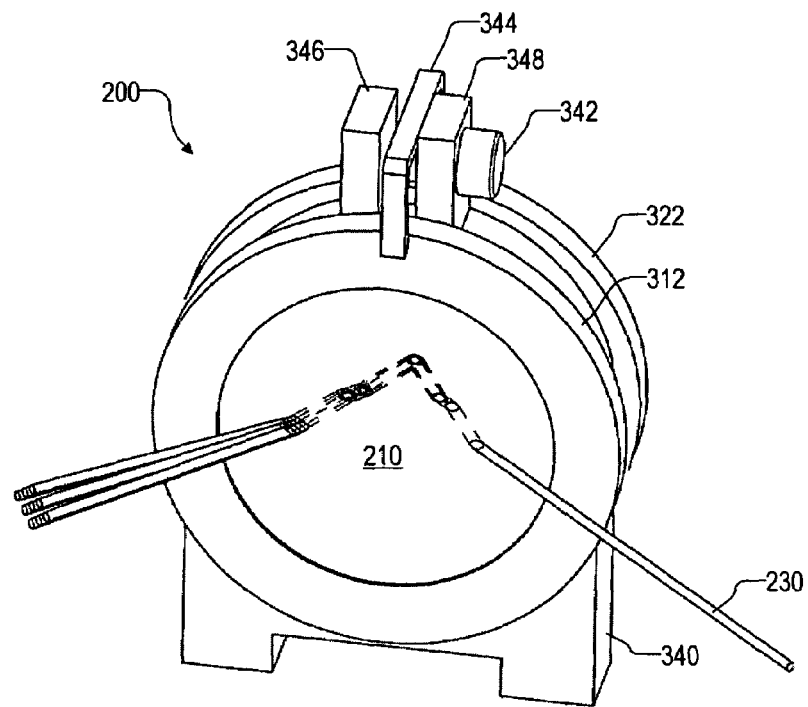
FIGS. 3 and 4 are perspective and exploded views of the adjustable turning mirror of FIG. 2 in one embodiment of the invention.
Figure 4:
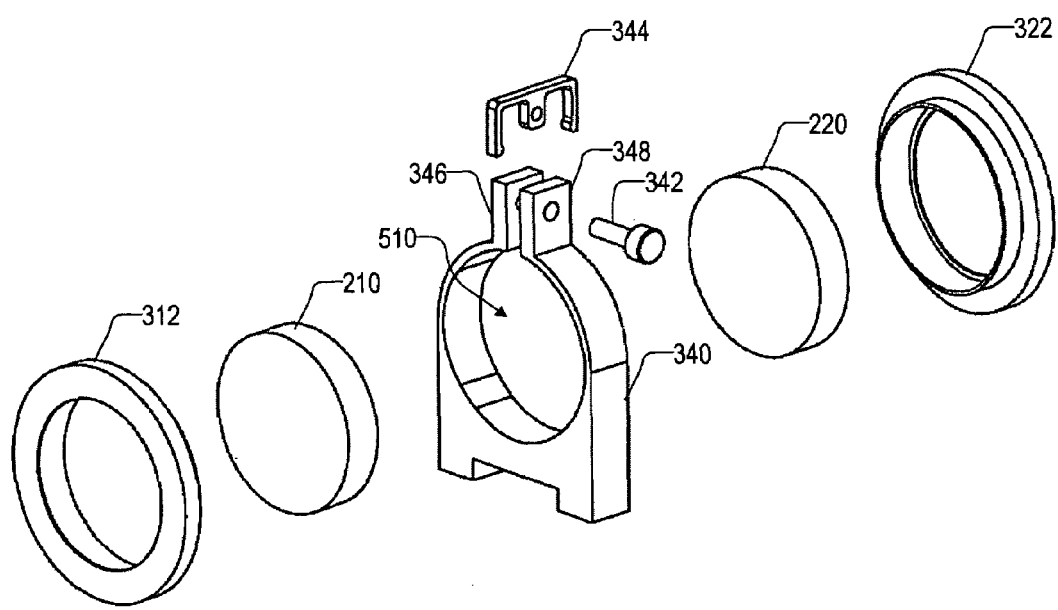

FIGS. 3 and 4 illustrate one configuration of mirror 200 in one embodiment of the invention. Wedges 210 and 220 are substantially circular and have substantially the same wedge angle (e.g., 1° physical wedge). The diameter of wedges 210 and 220 depends on the beam size and typically has a ratio of 5:1 with the wedge thickness. The prism material is typically BK7. The air gap between wedges 210 and 220 is minimized to reduce the overall size of mirror 200.

Wedges 210 and 220 fit into respective optic holders 312 and 322. Optic holders 312 and 322, which are substantially identical to each other, fit into an opening 510 (FIG. 4) in an optical mount 340 from opposing sides. Optic holders 312 and 322 are circular to permit rotation of one or both optic holders 312 and 322 in optical mount 340 when adjusting the beam reflection.

Figure 5:
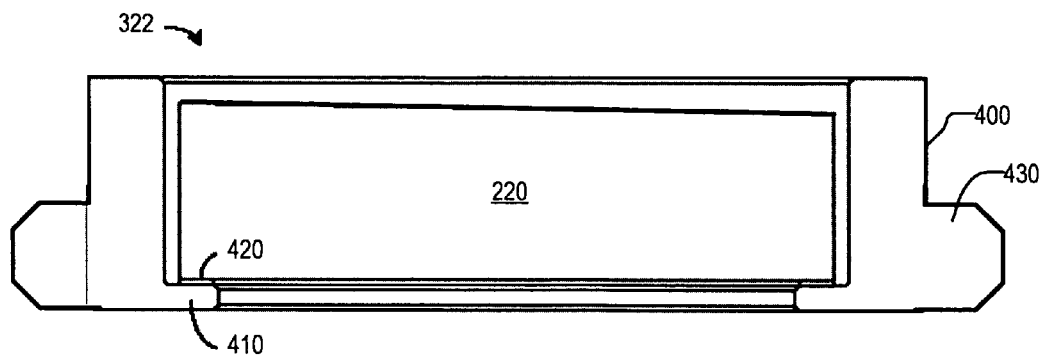
FIG. 5 is a cross-sectional view of an optic holder for receiving a wedge in the adjustable turning mirror of FIG. 2 in one embodiment of the invention.

FIG. 5 is a cross-sectional view of optic holder 322 in one embodiment of the invention. Optic holder 322 is a cylinder 400 with an inner ledge 410 extending inward from the inner circumference of the cylinder, and an outer ledge 430 extending outward from the outer circumference of the cylinder. In one embodiment, ledges 410 and 430 are on the same end of cylinder 400. Wedge 220 sits on and is glued to inner ledge 410 by a flexible adhesive 420. The use of a flexible adhesive 420 minimizes the effects of temperature or stress-induced deformation in wedge 220 when optic holder 322 is clamped in place. The inner diameter of optic holder 322 is made larger than the diameter of wedge 220 so that wedge 220 would not contact the sides of optic holder 322 under expansion. Thus, misalignment caused by temperature changes, humidity changes, and stress-induced birefringence in wedge 220 is minimized.

When optic holder 322 is inserted into opening 510, outer ledge 430 abuts the outer surface of optical mount 340 to limit the insertion depth of optic holder 322 into opening 510. The insertion depth in turn determines the air gap between wedges 210 and 220. Outer ledge 430 may include features such as ridges that facilitate the rotation of optic holder 322 within optical mount 340. Optic holder 312 can be similarly constructed as optic holder 322.

Figure 6:
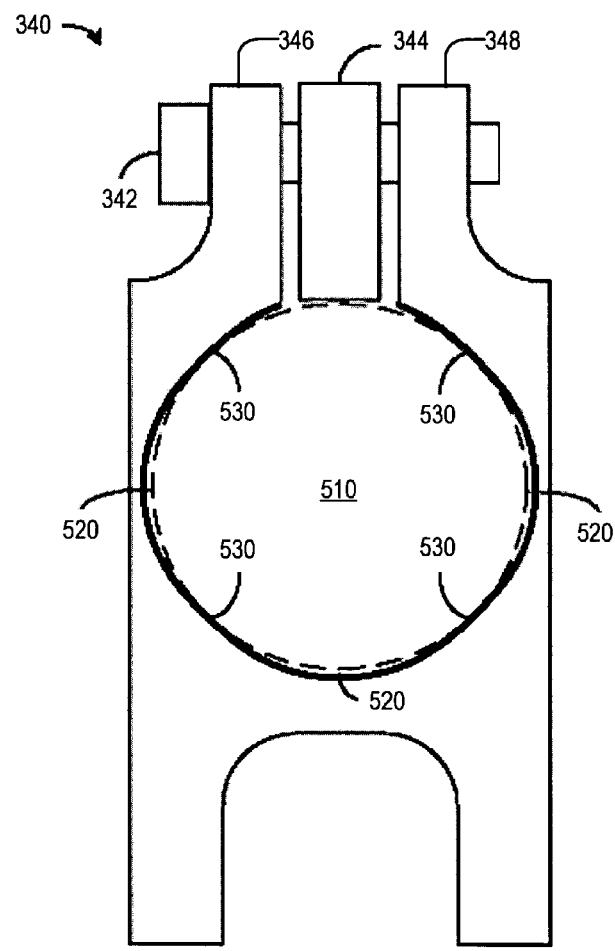
FIG. 6 is a front view of an optical mount for receiving the optic holders in the adjustable turning mirror of FIG. 2 in one embodiment of the invention.

FIG. 6 illustrates optical mount 340 in one embodiment of the invention. Optical mount 340 is a clamp having opening 510 into which optic holders 312 and 322 are inserted from opposing sides. Opening 510, instead of being circular, has scalloped or concave sections 520 so that only separated regions 530 around the perimeter of opening 510 contact optic holders 312 and 322. A clamping screw 342 tightens prongs 346 and 348 of optical mount 340 to keep optic holders 312 and 322 at fixed positions. Loosening clamping screw 342 allows the rotation of optic holders 312 and 322 to align the beam for the desired reflection, and a removable clip 344 prevents optic holders 312 and 322 from falling out of optical mount 340 when clamping screw 342 is loose. In one embodiment, optical mount 340 and optic holders 312 and 322 are made of a stable material (e.g., 416 stainless steel) that has a thermal expansion similar to that of wedges 210 and 220.

Figure 7:
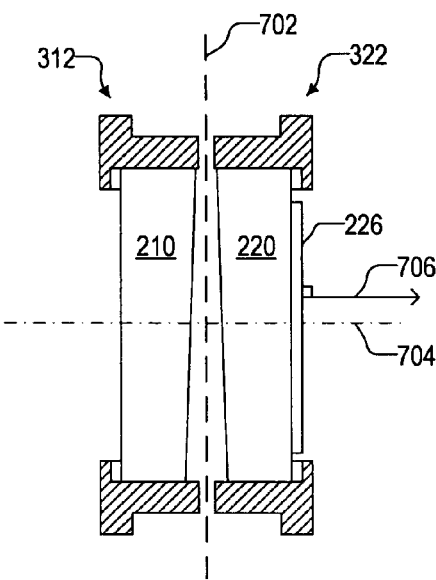
FIG. 7 is a cross-sectional view of a configuration of the adjustable turning mirror of FIG. 2 in one embodiment of the invention.

FIG. 7 illustrates the configuration of optic holders 312 and 322 when placed into optical mount 340 (FIG. 6) in one embodiment of the invention. As the two glued faces are placed away from each other, wedges 210 and 220 expand symmetrically toward a centerline 702 in order to minimize beam pointing due to temperature and humidity changes. Note that the rotation axis 704 of optic holders 312 and 322 is parallel to the mirror normal 706.

Figure 8:
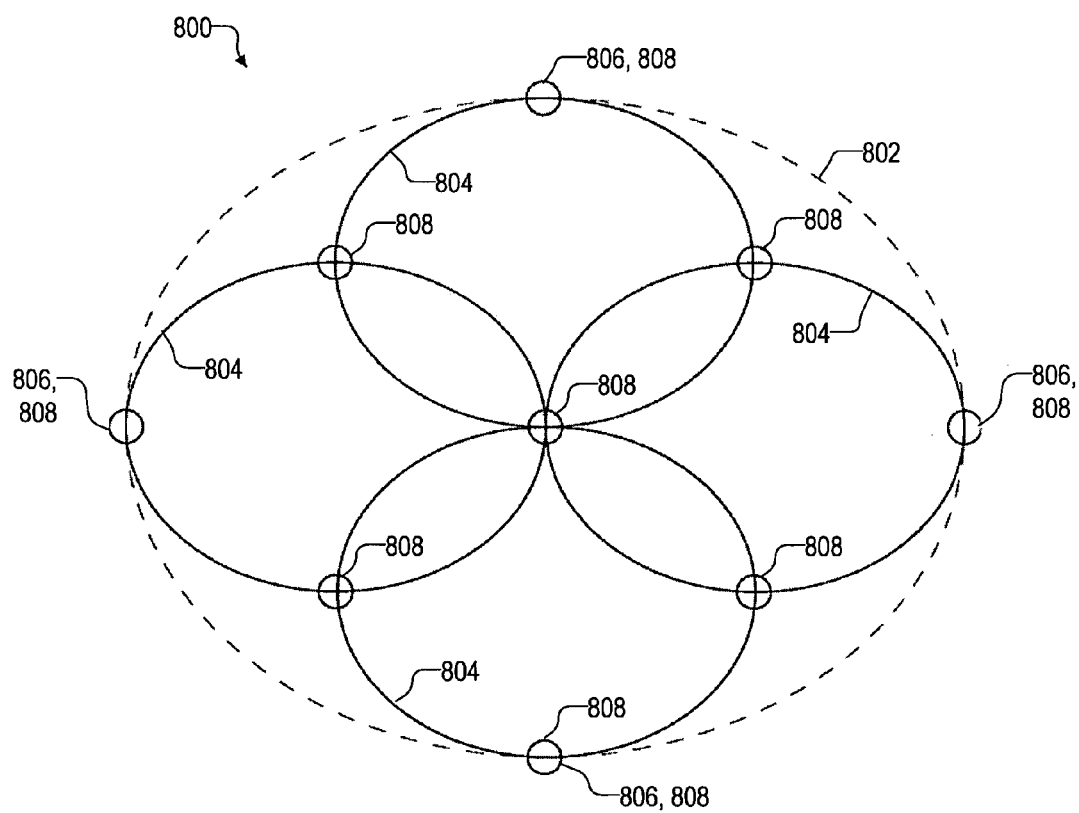
FIG. 8 is a map of the beam reflection achieved by adjusting the wedges of the adjustable turning mirror of FIG. 2 in one embodiment of the invention.

FIG. 8 illustrates a map 800 of beam reflection achieved by rotating wedges 210 and 220 in mirror 200 (FIG. 2). A dashed outer perimeter 802 illustrates the maximum range of beam reflection that can be achieved with the wedge pair. Along perimeter 802, solid inner perimeters 804 show a range of beam reflection that can be achieved when wedge 210 is rotated 360° while holding wedge 220 stationary. Locations 806 indicate 90° rotations of wedge 220, and locations 808 indicate 90° rotations of wedge 210. When combined, the rotation of wedges 210 and 220 can reflect the beam anywhere within outer perimeter 802.

Figure 9:
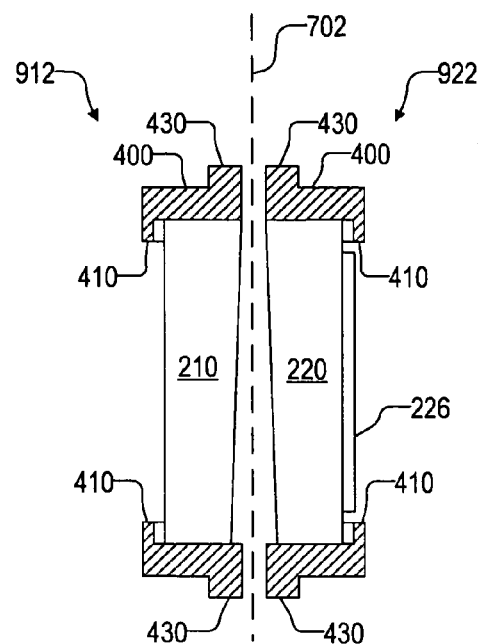
FIG. 9 is another configuration of the adjustable turning mirror of FIG. 2 in one embodiment of the invention.

FIG. 9 illustrates another configuration of mirror 200 (FIG. 2) in one embodiment of the invention. In this configuration, each of optic holders 912 and 922 has an inner ledge 410 and an outer ledge 430 at the opposite ends of cylinders 400. Again, wedge 210 and 220 are glued to inner ledge 410. Again wedges 210 and 220 are allowed to expand symmetrically toward centerline 702 in order to minimize distortion. In this configuration, two optical mounts 340 may be needed to hold optic holders 312 and 322 individually.

Figure 10:
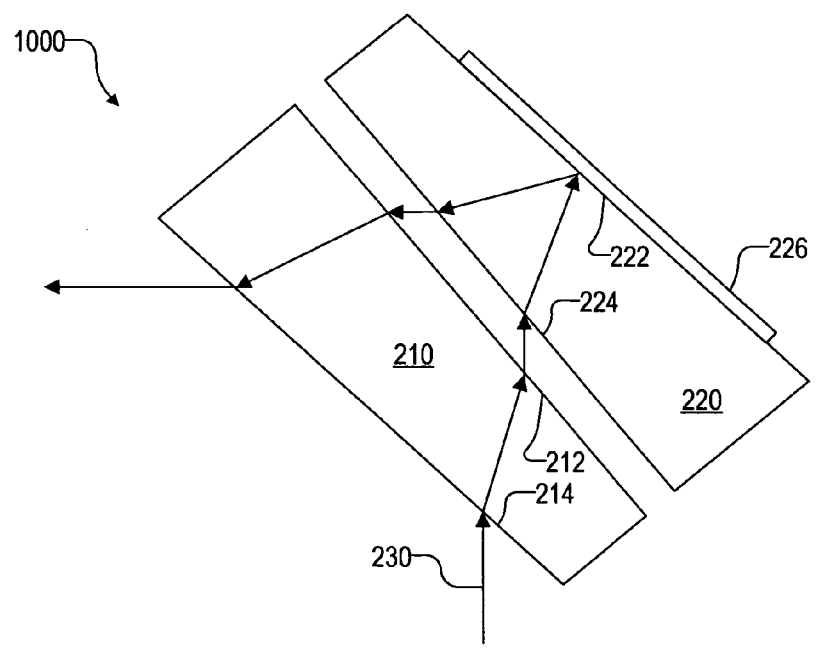
FIG. 10 is a cross-sectional view of another adjustable turning mirror in one embodiment of the invention.

FIG. 10 shows a side view of an adjustable turning mirror 1000 for reflecting a light beam in one embodiment of the invention. Unlike mirror 200 (FIG. 2), wedges 210 and 220 are configured with parallel surfaces 212 and 224 adjacent to each other and angled surfaces 214 and 222 furthest from each other. Furthermore, reflective coating 226 is now on surface 222.

Figure 11:
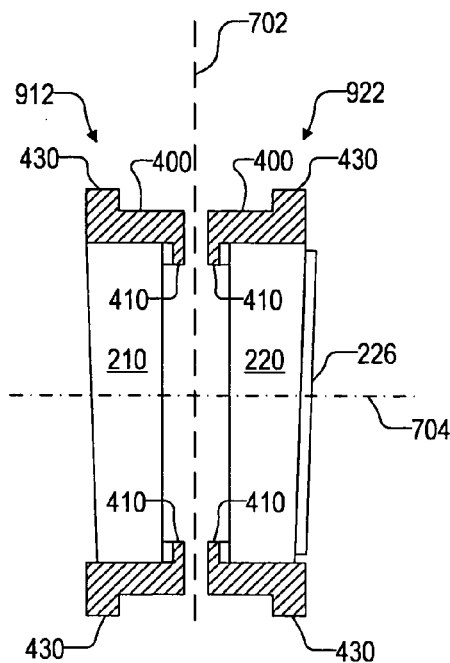
FIG. 11 is a cross-sectional view of a configuration of the adjustable turning mirror of FIG. 10 in one embodiment of the invention.

FIG. 11 illustrates one configuration of mirror 1000 (FIG. 10) in one embodiment of the invention. Mirror 1000 includes optic holders 912 and 922 that are inserted into optical mount 340 (FIG. 6) from opposite sides. In this configuration, the two glued faces of wedges 210 and 220 face one another so that wedges 210 and 220 expand symmetrically outward from centerline 702 in order to minimize beam pointing due to temperature and humidity changes.

Figure 12:
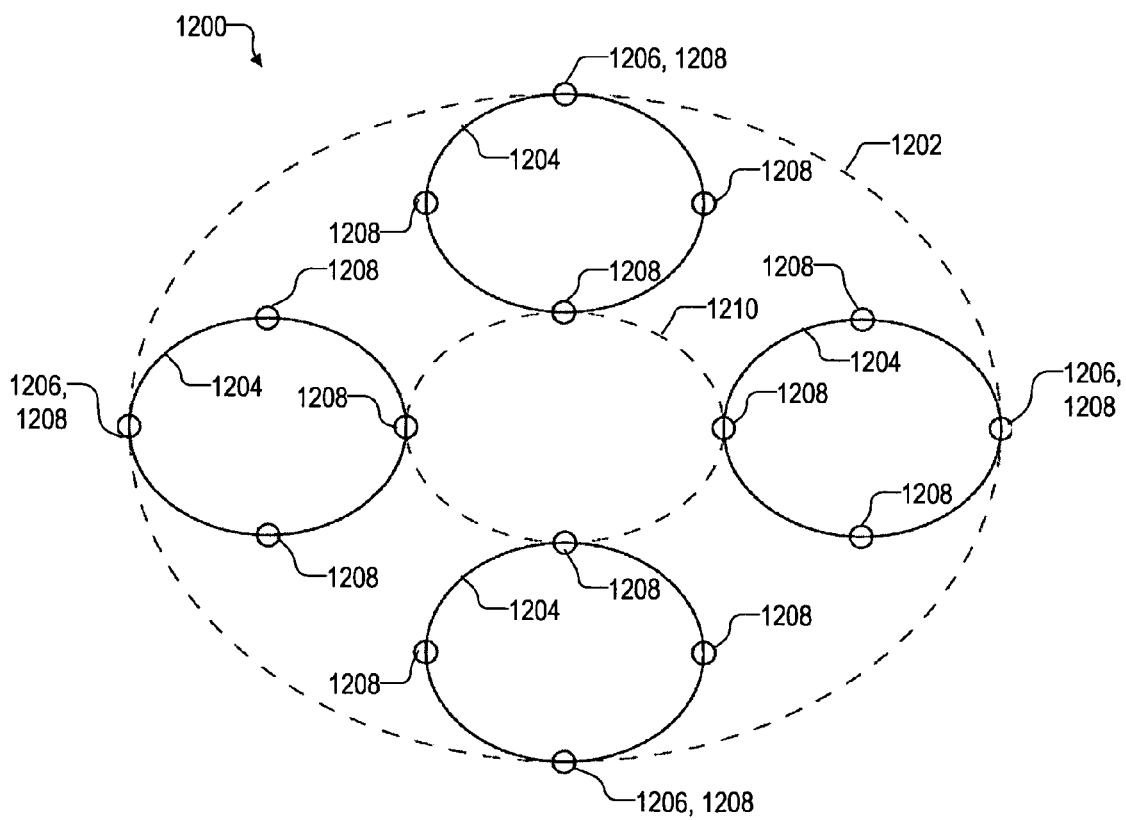
FIG. 12 is a map of the beam reflection achieved by adjusting the wedges of the adjustable turning mirror of FIG. 10 in one embodiment of the invention.

FIG. 12 illustrates a map 1200 of beam reflection achieved by rotating wedges 210 and 220 in mirror 1000 (FIG. 10). A dashed outer perimeter 1202 illustrates the maximum range of beam reflection that can be achieved with the wedge pair. Along perimeter 1202, solid inner perimeters 1204 show a range of beam reflection that can be achieved when wedge 210 is rotated 360° while holding wedge 220 stationary. Locations 1206 indicate 90° rotations of wedge 220, and locations 1208 indicate 90° rotations of wedge 210. As map 1200 shows, there may be a dashed inner perimeter 1210 delineating a region where the reflected light beam cannot impinge. This is caused by an angled reflective surface 222 that rotates about axis 704 (i.e. the mirror normal 706 and optic holder axis 704 are not parallel). Thus, the rotation of wedges 210 and 220 can reflect the beam anywhere between outer perimeter 1202 and inner perimeter 1210.

Various other adaptations and combinations of features of the embodiments disclosed are within the scope of the invention. For example, varying wedge angles and indices of refraction can be used to achieve the precision desired for the beam reflection. Furthermore, the wedges can be mechanically fastened to the optic holder. Numerous embodiments are encompassed by the following claims.

What is claimed is:

1. An apparatus for reflecting a light beam, comprising:
a first wedge comprising a first refracting surface and a second refracting surface;
a second wedge comprising a third refracting surface adjacent to the second surface, and a reflecting surface;
an optical mount comprising a clamp defining an opening;
a first optic holder mounted to the optical mount, the first optic holder comprising a first cylinder with a first outer ledge and a first inner ledge, wherein the first wedge is mounted to the first inner ledge and the first optic holder is received in the opening of the optical mount so the first outer ledge abuts a first side of the optical mount;
a second optic holder mounted to the optical mount, the second optic holder comprising a second cylinder with a second outer ledge and a second inner ledge, wherein the second wedge is mounted to the second inner ledge and the second optic holder is received in the opening of the optical mount so the second outer ledge abuts a second side of the optical mount;
wherein the light beam refracts at the first refracting surface, refracts at the second refracting surface, travels in air to the third refracting surface, refracts at the third refracting surface, reflects from the reflecting surface, refracts at the third refracting surface, travels in air to the second refracting surface, refracts at the second refracting surface, and refracts at the first refracting surface.

2. The apparatus of claim 1, wherein the reflecting surface comprises a surface having a reflective coating.

3. The apparatus of claim 1, wherein the reflecting surface comprises a mirror optic mounted to a surface of the second wedge.

4. The apparatus of claim 1, wherein the optical mount further includes a clamping screw for adjusting the clamp so that the first wedge and the second wedge can be rotated and then fixed.

5. The apparatus of claim 4, wherein the opening comprises scallops so that only parts of a perimeter of the opening contacts the first and the second optic holders.

6. The apparatus of claim 1, wherein the first inner ledge and the first outer ledge are located at opposite ends of the first cylinder.

7. The apparatus of claim 1, wherein the first refracting surface and the reflecting surface are substantially parallel.

8. The apparatus of claim 1, wherein the second and the third refracting surfaces are substantially parallel.

9. The apparatus of claim 1, wherein the first wedge is glued to the first inner ledge.

10. The apparatus of claim 1, wherein the first wedge has a wedge angle that is substantially equal to a wedge angle of the second wedge.

11. An apparatus for reflecting a light beam, comprising:
a first wedge comprising a first refracting surface and a second refracting surface;
a second wedge comprising a third refracting surface adjacent to the second surface, and a reflecting surface;
an optical mount comprising a clamp defining an opening;
a first optic holder mounted to the optical mount, the first optical holder comprising a first cylinder with a first outer ledge and a first inner ledge located at the same end of the first cylinder, wherein the first wedge is mounted to the first inner ledge and the first optic holder is received in the opening of the optical mount so the first outer ledge abuts a first side of the optical mount;
a second optic holder mounted to the optical mount opposite the first optic holder, the second optic holder comprising a second cylinder with a second outer ledge and a second inner ledge, wherein the second wedge is mounted to the second inner ledge and the second optic holder is received in the opening of the optical mount so the second outer ledge abuts a second side of the optical mount;
wherein the light beam refracts at the first refracting surface, refracts at the second refracting surface, travels in air to the third refracting surface, refracts at the third refracting surface, reflects from the reflecting surface, refracts at the third refracting surface, travels in air to the second refracting surface, refracts at the second refracting surface, and refracts at the first refracting surface.

12. An apparatus for reflecting a light beam, comprising:
a first wedge comprising a first refracting surface and a second refracting surface;
a second wedge comprising a third refracting surface adjacent to the second surface, and a reflecting surface;
an optical mount comprising a clamp defining an opening;
a first optic holder mounted to the optical mount, the first optical holder comprising a first cylinder with a first outer ledge and a first inner ledge, wherein the first wedge is mechanically held against the first inner ledge and the first optic holder is received in the opening of the optical mount so the first outer ledge abuts a first side of the optical mount;
a second optic holder mounted to the optical mount opposite the first optic holder, the second optic holder comprising a second cylinder with a second outer ledge and a second inner ledge, wherein the second wedge is mounted to the second inner ledge and the second optic holder is received in the opening of the optical mount so the second outer ledge abuts a second side of the optical mount;
wherein the light beam refracts at the first refracting surface, refracts at the second refracting surface, travels in air to the third refracting surface, refracts at the third refracting surface, reflects from the reflecting surface, refracts at the third refracting surface, travels in air to the second refracting surface, refracts at the second refracting surface, and refracts at the first refracting surface.

13. An apparatus for reflecting a light beam, comprising:
a first wedge comprising a first refracting surface and a second refracting surface;
a second wedge comprising a third refracting surface adjacent to the second surface, and a reflecting surface;
a first optical mount comprising a first clamp defining a first opening;
a first optic holder mounted to the first optical mount, the first optic holder comprising a first cylinder with a first outer ledge and a first inner ledge, wherein the first wedge is mounted to the first inner ledge and the first optic holder is received in the first opening of the first optical mount so the first outer ledge abuts a first side of the first optical mount;
a second optical mount comprising a second clamp defining a second opening;

a second optic holder mounted to the second optical mount, the second optic holder comprising a second cylinder with a second outer ledge and a second inner ledge, wherein the second wedge is mounted to the second inner ledge and the second optic holder is received in the second opening of the second optical mount so the second outer ledge abuts a second side of the second optical mount;

wherein the light beam refracts at the first refracting surface, refracts at the second refracting surface, travels in air to the third refracting surface, refracts at the third refracting surface, reflects from the reflecting surface, refracts at the third refracting surface, travels in air to the second refracting surface, refracts at the second refracting surface, and refracts at the first refracting surface.

14. The apparatus of claim 13, wherein the first outer ledge and the first inner ledge are on opposite ends of the first cylinder, and the second outer ledge and the second inner ledge are on opposite ends of the second cylinder.

15. The apparatus of claim 14, wherein the first outer ledge and the second outer ledge are adjacent and the first inner ledge and the second inner ledge are further apart.

* * * * *